W. A. WATSON.
METAL PLAYER.
APPLICATION FILED APR. 4, 1914.

1,269,763.

Patented June 18, 1918.
6 SHEETS—SHEET 1.

Witnesses:
Agnes M. Shea.
L. B. Weymouth.

Inventor:
William A. Watson,
by O. W. Harrison
Atty.

W. A. WATSON.
METAL PLAYER.
APPLICATION FILED APR. 4, 1914.

1,269,763.

Patented June 18, 1918.
6 SHEETS—SHEET 5.

Witnesses:
Agnes M. Shea.
L. B. Weymouth.

Inventor:
William A. Watson,
by N. W. Harrison
Atty.

W. A. WATSON.
METAL PLAYER.
APPLICATION FILED APR. 4, 1914.

1,269,763.

Patented June 18, 1918.
6 SHEETS—SHEET 6.

Witnesses:
Agnes M. Shea.
L. B. Weymouth.

Inventor:
William A. Watson,
by [signature]
Atty.

UNITED STATES PATENT OFFICE.

WILLIAM A. WATSON, OF MALDEN, MASSACHUSETTS.

METAL PLAYER.

1,269,763.　　　　Specification of Letters Patent.　　Patented June 18, 1918.

Application filed April 4, 1914. Serial No. 829,513.

*To all whom it may concern:*

Be it known that I, WILLIAM A. WATSON, of Malden, in the county of Middlesex and State of Massachusetts, have invented certain new and useful Improvements in Metal Players, of which the following is a specification.

This invention relates to musical instruments of the character generally known as player pianos, and one of the objects of the present invention is to secure to the utmost the effective operation of the various controls of a player piano, and to provide for the most convenient relationship of the manuals operated by the performer.

Another object is to eliminate to the utmost the use of such materials, or the presence of such joints in the various conduits as would be liable to result in leakage.

A further object is to reduce as much as possible the volume or capacity of all conduits or chambers in order to employ a minimum number of cubic inches of air that must be held under varying degrees of tension.

A further object is to provide such a construction and association of parts as to render it practically impossible for any disarrangement or bending to impair perfect operation.

A further object is to provide such a construction and arrangement of parts that different groups of mechanism may be removed as units for inspection and repairs.

It is, of course, well understood that a musical instrument of this character, to be at its best, must be capable of responding properly to the manually expressed desires of the musical mind of the performer, whether the performer has a high musical education or not. It is essential that the notes may be accented, subdued, sustained, and played soft or loud, and also that any part of the music roll may be entirely skipped, and it is highly desirable that any or all of these controls may be effected with the hands of the performer in one position.

For durability and permanence of construction and the utmost non-leakable conditions under different and the most severe climatic conditions, it is highly desirable that seamless metal shall be utilized to the utmost so that all air-ways shall be non-leakable. The more seamless metal that is used, and the lesser the number of packed joints, the more durable will be the instrument and the greater its capability of retention of power. Leakages finally result in such loss of power as to enable the performer to do little more than cause the notes to be struck, and that but feebly. Control and fineness of expression become impossible. In attaining my objects I not only employ seamless shells for the primaries, but also a seamless combination expression box and cut-out box so as to eliminate the auxiliary boxes, slides, levers, etc., usually employed heretofore. The tubes from the tracker bar to the primary shells are also of seamless metal preferably brass. All portions of the mechanism which can possibly be made of metal, are either made of seamless metal or of sheet metal so united as to reduce to the utmost all necessity of packing to secure tight joints. Air is so fine or so subtle that it easily eludes mechanism employing it for its operation, and it is very difficult to find where leakages exist. Of course, to employ a sufficient amount of power to operate the player when leakages occur means incessant work in operating the pumping bellows or exhauster. By my improvements I am able to keep such control of the vacuum tension as to enable a single stroke of the pumping bellows to store up enough power to play a whole measure of music before it becomes necessary to repeat the operation, and at the same time I am able to secure the utmost fineness of expression.

I will mention that the preferable way of forming the seamless and chambered portions of my improved mechanism is that known as "die casting", this being a process of forcing melted material under high pressure into a steel mold or die.

It will be observed that the tempo box is made entirely of metal and it has little windows through which can be seen the tempo valve in its work of graduating the time. With the tempo box I have so combined the re-wind valve and the short stop valve as to not only render visible to the performer parts that have heretofore been little understood as to their operations, but also to render them easily accessible.

With the above stated and further objects in view my invention consists in the construction and combination of parts substantially as hereinafter described and claimed.

Of the accompanying drawings.

Similar reference characters indicate the same or similar parts in all of the figures.

Such parts of the casing and frame and details of the piano itself as are illustrated in the drawings are or may be of any ordinary or preferred type. It will not be necessary herein to describe or even mention many of the parts of the piano itself, and it will be sufficient to refer to the string frame or plate 20, the strings 21, the sounding-board 22, the piano action as a whole indicated at 23, the key-bottom 24 and the key-frame 25.

Figures 1, 2:
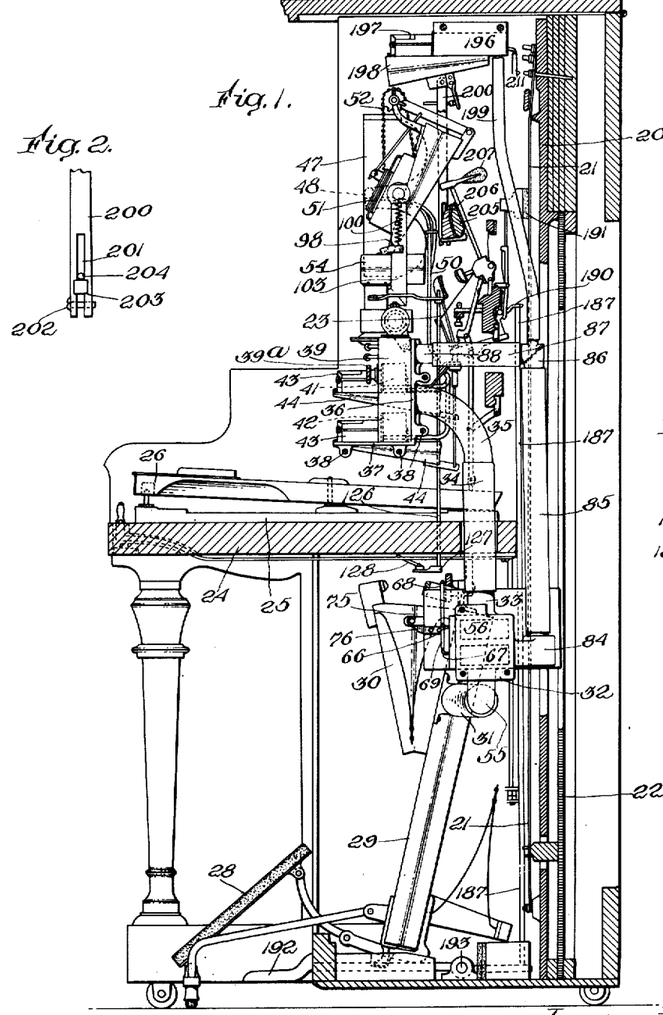
Figure 1 is an end elevation, with parts in section, of a player piano embodying my improvements.
Figs. 2 and 3 are detail elevations of connections partly shown in Fig. 1.
Figures 4, 5, 6, 20:
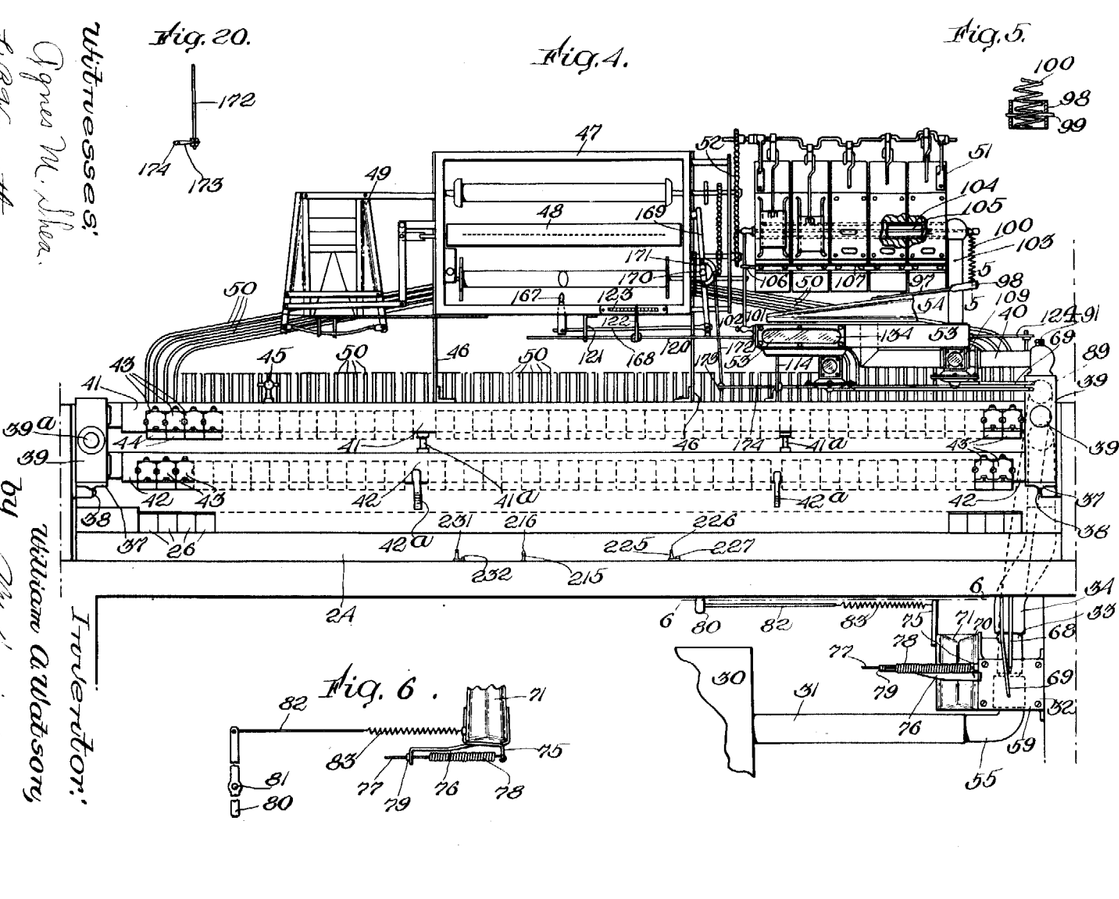
Fig. 4 is a front elevation of the principal portions of the player mechanism, some of the parts such as the tracker tubes being omitted to avoid confusion.
Fig. 5 represents a section on line 5—5 of Fig. 4, on a larger scale.
Fig. 6 is a detail plan view looking from line 6—6 in Fig. 4.
Fig. 20 is a detail view of one end of the rock shaft shown in section in Fig. 12.
Figures 7, 8, 9:
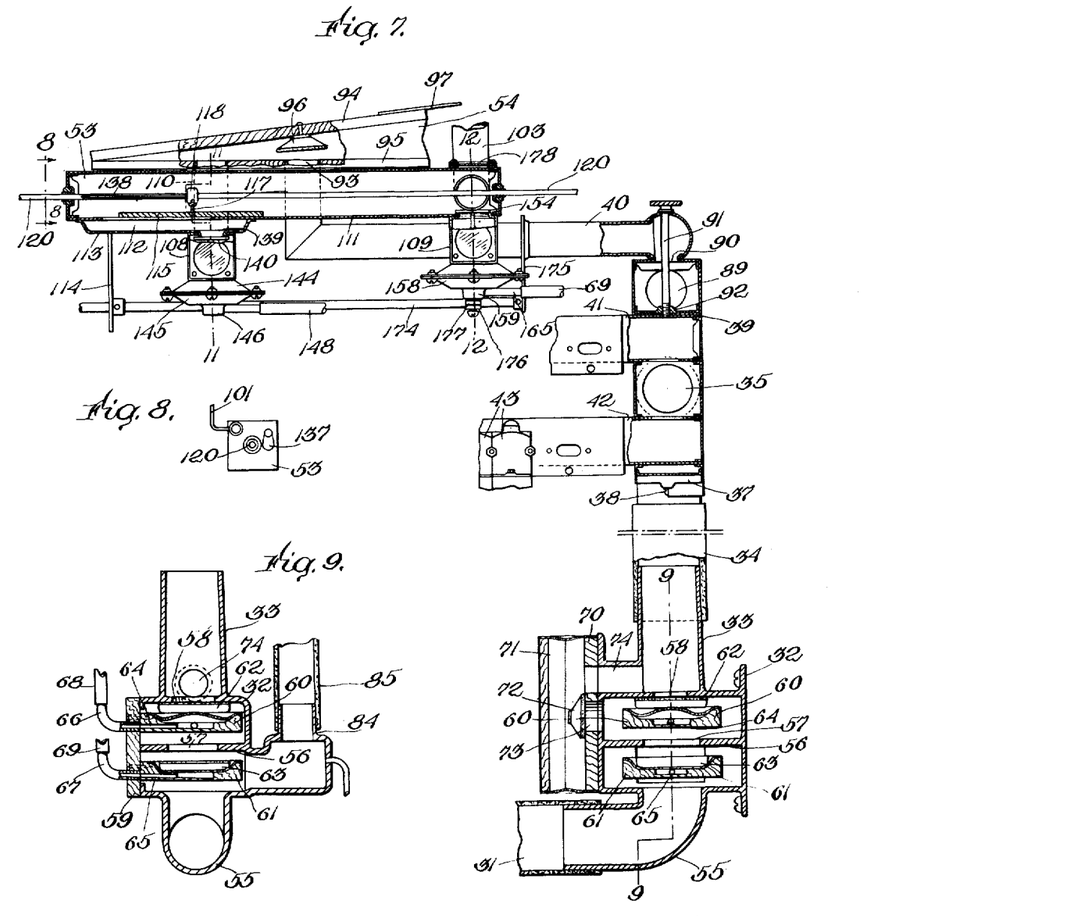
Fig. 7 is a front elevation, partly in section, of some of the parts shown in Fig. 4.
Fig. 8 is a detail end view looking from line 8—8 of Fig. 7.
Fig. 9 represents a section on line 9—9 on Fig. 7.

The keys 26, as well as the parts just referred to are sufficiently illustrated in Fig. 1, which figure also illustrates pedals 28 having suitable connections for operating the bellows 29 having the usual equalizer 30 to which is connected a wind way or vacuum main 31, the other end being connected to the lower nipple of the expression box 32. (Figs. 7 and 9). As hereinafter described, this expression box and its nipples are one seamless element. The upper nipple 33 of the expression box is connected by a pipe 34 with a curved pipe or nipple 35 (Fig. 1), thereby constituting a continuation of the vacuum main through the expression box. The curved nipple 35 leads from and is integral with the back plate 36 of a bracket having a foot 37. As shown in Fig. 4 there is one of these brackets at each end of the piano, the brackets being suitably secured to fixed portions of the frame or casing by means of screws or bolts 38. The vacuum main is connected to the back plate of one of the brackets, but the feet of the two brackets support two cheek boxes 39, said cheek boxes having tubular apertures through which bolts 39ª pass into the back plates of the brackets to removably secure the cheek boxes in position. The two brackets support all of the mechanism shown in Fig. 4, which mechanism can be removed as a unit for inspection or repairs, and to facilitate access to the tone-producing elements, in the rear. Connecting the two cheek boxes are upper and lower pneumatic vacuum chests 41, 42 to which the striking or power pneumatic seamless shells 43 are individually and removably connected, such shells being either of the construction shown in my Patent 1,059,324, or my application 737,074, filed Dec. 16, 1912. Said shells will be referred to more in detail hereinafter. Below the shells and the vacuum chests are the striking pneumatics 44. A suitable handle such as indicated at 45 in Fig. 4 is connected to the upper vacuum chest 41. The motor main 40 illustrated in Fig. 4, and hereinafter described is so rigidly connected with the other parts that a person by grasping the handle 45 and the main 40, can lift and remove the mechanism shown in Fig. 4, when the bolts 39ª which hold the cheek boxes in place are removed.

In order that when removed, the vacuum chests 41, 42 and the mechanism above them may rest upon the floor or chambers without tipping or straining the connections, I provide feet 42ª (Fig. 4) projecting below the plane of the lower row of shells 43, and struts 41ª between the two chests 41, 42.

Legs 46 rising from the upper vacuum chest 41 support the tracker box or spool box 47, the tracker bar being indicated at 48. The right hand leg 46 is a master support which co-acts with other parts in supporting the bearings for the transmission gearing 52. This master support extends to the top of the spool box 47 and is secured thereto. It is a flat plate connecting to a parallel plate by upper and lower tie rods as shown in Fig. 4. The two plates have bearings for all of the shafts of the transmission gearing. Therefore any shrinkage or swelling of the wood tracker box can not alter the proper degree of tautness of the chains of said gearing.

In Fig. 4 I illustrate a regulator 49 which may be of the type illustrated in my application 771,034 filed May 31, 1913. The tracker tubes 50, of which only a few are illustrated in Fig. 4, are of seamless brass and are so connected as explained in my application Serial No. 788,297 filed September 5, 1913, as to aid in supporting and steadying the spool box.

The motor 51 illustrated in Figs. 1 and 4 will be referred to more in detail hereinafter. Below the motor is the tempo throttle box 53 which as well as the automatic motor regulator bellows 54 will be hereinafter described more in detail.

Referring particularly to Figs. 7 and 9, the expression box 32, including lower nipple 55 and the upper nipple 33, is a seamless shell, having one side, however, entirely open as presently explained. That is, this shell has an open side which is closed by a cover or removable plate 59. The construction is such there is no possibility of leakage, and yet access may be had to the internal pneumatics and valves for inspection and repairs. This expression box, including its integral nipples, is seamless excepting for the one side which the plate 59 covers, and therefore reduces liability of leakage by reducing joints. It contains both the by-pass valve and the cut-out valve which usually are contained in two casings. It avoids the necessity of a double tapping of the bellows and reduces the number of cubic inches of air whose tension must be varied in playing. Said box is formed with a partition 56 having an aperture 57, the top of the box having an aperture 58 which communicates with the portion 33 of the vacuum main. The removable plate 59 of the box 32 may be secured in place by suitable screws indicated by dotted lines and said plate has two shelf-like projections 60, 61, the upper entering the upper chamber of the expression box, and the lower one entering the lower chamber of said box. These projections are supported at one edge only by the plate 59 and are of such lateral area as to permit free passage of air around their other three edges, thereby offering practically no resistance to the transmission of power through the vacuum main 62 and 63 are valves supported by diaphragms carried by the projections 60, 61 respectively, valve 62 being hereinafter referred to as the by-pass valve, and the valve 63 being referred to as the cut-out valve, said valve 63 serving to prevent playing when re-winding the sheet or music roll, or causing said sheet to travel rapidly without resulting in any notes, this action being referred to as skipping.

64, 65 represent small ports in the projections 60, 61, respectively, said ports communicating with the spaces below the diaphragms which support the valves. Tubular nipples 66, 67 having preferably flexible tubes 68, 69 connected thereto connect with ports 64, 65 respectively. (See also Fig. 4.)

It is as well to understand at this point that when atmospheric air is admitted through either one of the tubes 68 or 69 the tension in the compartments of the expression box will cause the seating of the valve or valves just described.

As best shown in Fig. 7 one side of the expression box 32 has secured thereto the base or side member 70 of the expression bellows 71, said bellows being also commonly known as the choker or regulating bellows.

The movable member of this bellows carries a valve 72 to control the port 73 to the upper chamber of the expression box. A port 74 connects the interior of the expression bellows with the vacuum main above the expression box, so that the valve 72 may by varying its position, control the flow of air through the ports 73, 74, or in other words control the flow of air from the striking pneumatic to the exhauster or power plant. The air tends to pass from port 74 to and through port 73, and the valve 72, when closed, prevents such passage. Hence valve 72 covers port 73. During playing, the movable member of the expression bellows, as is well understood, controls the volume of sound by determining the force with which the striking pneumatics operate. It is essential, of course, that the movable member of the expression bellows shall be under the influence of a spring, said spring acting in a direction to oppose collapsing of the expression bellows. As illustrated in Fig. 6, an arm 75 is connected with the movable member of the bellows 71 and an arm 76 is connected with the fixed side thereof. Of course, the arm 76 might be held stationary by any other means. The outer end of the arm 76 is bent at an angle and is formed with an aperture to guide a screw 77. The inner end of this screw is connected with the bent end of the arm 75 by means of a tension spring 78. One or more adjustable stops 79 on the screw 77, enables the tension of the spring 78 to be adjusted. It will now be understood that by shifting the screw 77 toward the left, the tension of the spring 78 will be increased, and therefore the movable member of the expression bellows will only yield under an increased vacuum tension within said bellows.

Figure 18:
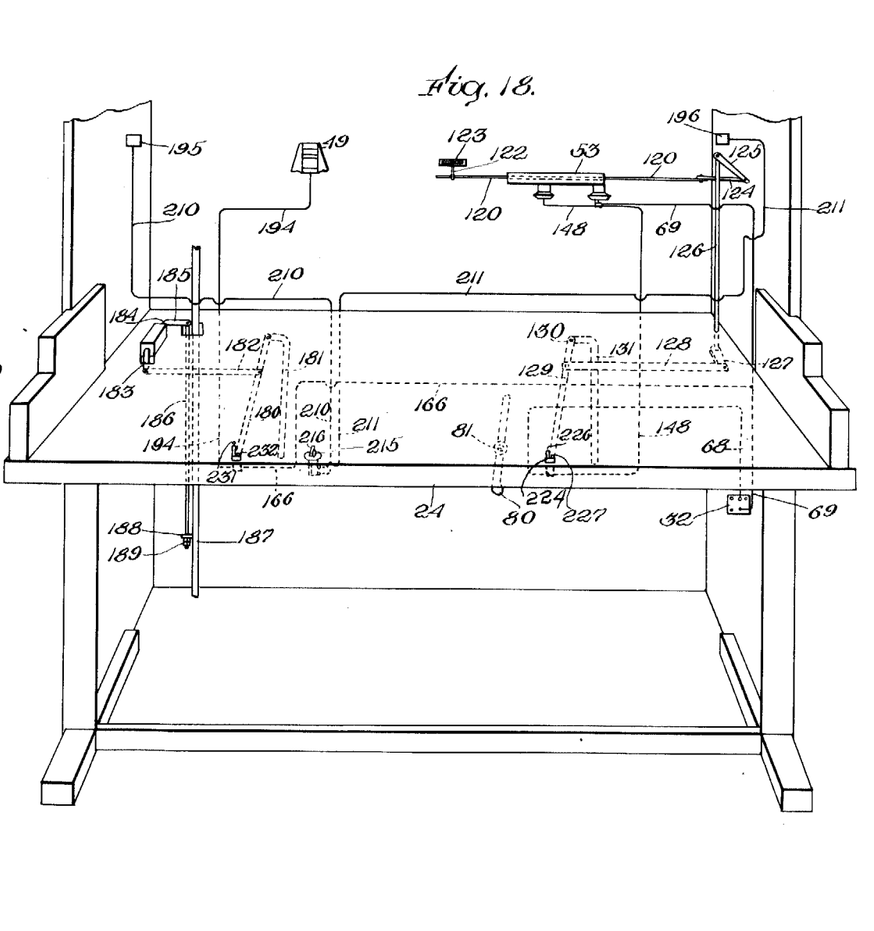
Fig. 18 is a diagram in perspective to illustrate the relationship of the several manuals or controls.

It will be understood, of course, that variations of the spring 78 will vary the volume of tone obtained as a result of any degree of vacuum tension produced by the exhauster bellows, whether the exhauster bellows be operated by foot power or by any suitable motor-operated exhauster. Of course, if an electrically driven or other motor-operated exhauster be employed, control cannot be effected by means of the foot of the performer. As illustrated in Figs. 4, 6 and 18, I may employ a lever 80 pivotally supported as at 81 and having its front portion so formed and located as to enable the front end of the lever to be moved toward the right by the hand or right knee of the performer. A link 82 connects the end of the knee lever 80 with one end of a spring 83, said spring being connected to the movable member of the expression bellows 71. These parts just mentioned are so constructed and relatively arranged that when the lever 80 is in normal position the spring 83 will be under little or no tension, the spring 78 being then the only one which acts to operate the expression bellows. Upon shifting the knee lever 80, however, the spring 83 may be put under such tension as may be desired so as to draw the movable member of the expression bellows toward the left, thereby shifting the valve 72 (Fig 7) farther away from port 73 so as to permit more air to pass said port. The spring 83 may be put under varying tension by other suitable means. It will now be understood that the power plant (the exhauster) may be operated by an electric or other motor without interfering with the ability of the performer to obtain all the expression desired by varying the degree of vacuum tension which is often referred to as "pressure."

Referring to Figs. 1 and 9 it will be seen that the expression box is formed with a rear nipple 84 which is connected by a pipe 85 with an elbow coupling 86 the latter being connected by a pipe 87 with a nipple 88 projecting rearwardly from the bracket plate 36. The passageway through this nipple 88 registers with an opening 89 (Fig. 7) communicating with the chamber in a box or shell above the right hand end of the vacuum chest 41. An aperture 90 provides for communication between this chamber and the passageway in the motor main 40. A bolt 91 extends down through the top of the globular portion of the motor main 40 into an internally threaded thickened portion 92 of a reinforcing plate, said bolt preferably passing into the top of the vacuum chest 41, the bolt being fitted so tightly that no leak can result. This provides a strong connection which enables the main 40 to be repeatedly and safely utilized as one of the two handles for lifting the player mechanism out of the piano casing when the bolts 39ᵃ are removed, because said bolt prevents liability of such use resulting in leakage. As illustrated in Fig. 4, the ends of the chests 41, 42 extend entirely through the cheek box 39 and are secured to the outer wall thereof. The same structure, in practice, exists at the other end of the chests 41, 42. These features, in connection with the struts 41ᵃ before mentioned, provide a truss-like structure that is supported solely by the brackets 36, 37 resulting in avoiding any weight-strain on the middle portion of the key bed.

Figure 11:
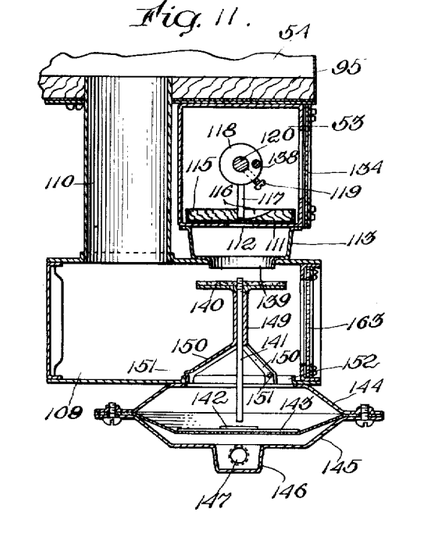
Figs. 11 and 12 represent respectively sections on lines 11—11 and 12—12 of Fig. 7 on a larger scale.
Figure 12:
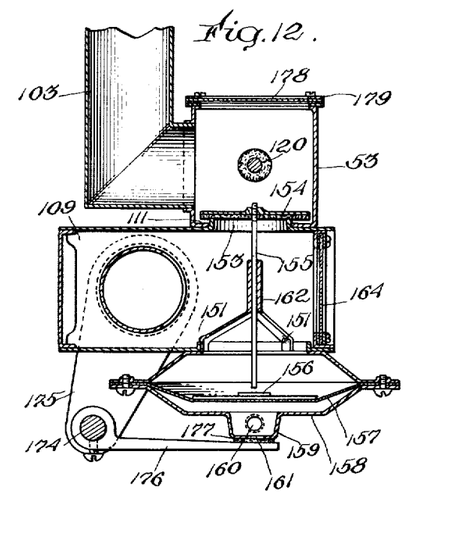

As best shown in Fig. 7, the motor main 40 communicates by means of an aperture 93 with the interior of the regulator 54, the movable member which is indicated at 94, the base member 95 being rigidly fixed to the top of the tempo box. (See also Fig. 11). The movable member 94 carries a valve 96 which controls the air passing through the motor main 40. Said movable member has an arm 97 the outer end of which is formed as a loop 98 (Figs. 4 and 5). A pin 99 is mounted diametrically in said loop, said pin passing through one of the lower coils of a spring 100 the upper end of which is supported as presently described. A standard 101 (Fig. 4) rises from a stud 102 projecting from the left end of the tempo box. A hollow standard 103 is supported by the other end of the tempo box (Figs. 4 and 12). A tubular shaft 104 having a rod or bolt 105 extending through it and through the standards 101, 103, pivotally supports the several units of the motor for a purpose presently described. Shaft 104 has, of course, suitable openings for the passage of the air which causes the motor units to operate. As the structure of the motor units forms no part of my present invention excepting the pivotal support thereof as just mentioned, detailed description of said units and their valves and how they operate and the usual multiple crank shaft for the transmission gearing would be unnecessary.

The standard 101 passes through the eye of a screw-eye 106 which is fixed to the end unit of the motor in the position that may be desired to insure the motor units standing at the angle that may be necessary in order to accommodate the entire player mechanism to a particular style of piano. The several units of the motor are connected or braced by a transverse bar 107 (Fig. 4). By comparing Figs. 1 and 4 it will be readily understood that by setting the screw-eye 106 in the proper position in the end of the motor, so that when the motor is mounted with the standard 101 running through the eye of the screw-eye, the motor can be set so that it will be inclined as indicated in Fig. 1 or set at any inclination that may be necessary. This adjustable feature is desirable because of the different amounts of rearward projections of the hammers of different makes of pianos, and it being, of course, desirable to have the valve faces of the units inclined as much as possible to insure proper seating of the motor-unit valves.

Figure 10:
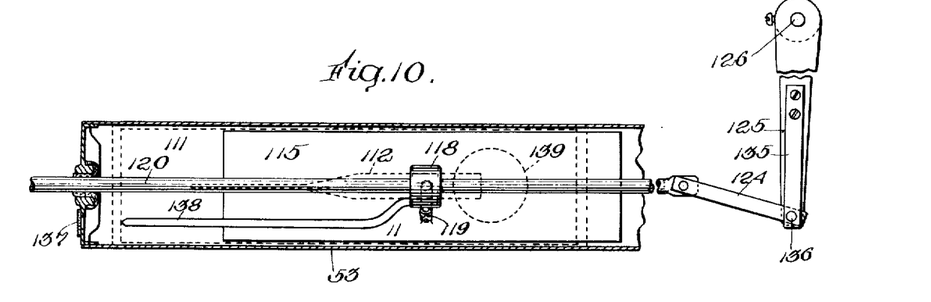
Fig. 10 is a detail sectional view of the tempo box and connections.

Below the tempo box and rigidly connected with it are two boxes 108 and 109 containing respectively the short stop valve and the re-wind valve hereinafter described. A pipe 110 connects the regulator 54 with the box 108 (Fig. 11). The floor 111 of the tempo box 53 is formed with an elongated slot 112, which is best shown by dotted lines in Fig. 10, said slot being quite wide at one end and narrow at the other end with an intermediate tapering portion. Below the slotted portion of the floor of the tempo box is a shallow box 113 the chamber in which of course communicates with the interior of the tempo box, the air that is permitted to pass going through the slot 112. The left hand end of the tempo box is supported by a strut 114 (Fig. 4) rising from the top of the vacuum chest 41 and the right hand end is supported by the motor main 40 through the medium of the box 109, a portion of one side of the main 40 having an opening, as shown in Fig. 12, to provide constant communication between said main and the interior of the box 109.

The tempo valve 115 which is fitted to slide on the floor of the tempo box has its under face as usual covered with leather or other suitable material as indicated in Fig. 11. Its upper face is formed with a transverse recess 116 (Figs. 7 and 11), said recess having an abrupt wall at substantially the midwidth of the valve. This recess receives a pin 117 projecting downwardly from a hub 118 secured by a screw 119 to the valve rod 120 which extends through suitable stuffing boxes in the ends of the tempo box. The outer end of the valve rod 120 is supported by a guide bracket 121 (Fig. 4) depending from the tracker box. Said rod carries a pointer 122 which coöperates in the usual manner with a tempo scale 123 attached to the tracker box. Owing to the fact that the pointer is carried by the same rod which actuates the tempo slide valve, there can be no lost motion between said pointer and valve. Said valve being once correctly adjusted longitudinally of the rod 120 by the screw 119 results in there being a certainty of correspondence between the actual effect of shifting the tempo valve and the indication of that effect on the scale 123. The other end of the rod 120 is connected by a link 124 (Figs. 10 and 18) with an arm 125 projecting from the upper end of a vertical rock shaft 126 said shaft having a lower arm 127 connected by a link 128 with the tempo lever 129 which is pivotally supported at 130 to the rear end of an angular arm 131 having two slots 132, 133 through which suitable screws are passed into the key bed of the piano.

Figure 19:
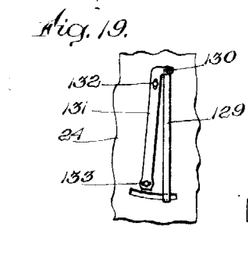
Fig. 19 is a detail plan view from below of one of the manual levers and its adjustable support.

The reason for the employment of the angular arm 131 with its slots as described is that it is customary and preferable to have the portion of the tempo lever which must be grasped by the performer project outwardly, through a slot in the key bed or other portion of the piano. The front end of the lever must necessarily shift in a curved path. Under varying climatic conditions it sometimes happens that there will be a binding in said curved slot. By providing the arm 131 as illustrated in Figs. 18 and 19, with the front slotted end in proximity to the curved slot for the lever handle, any shrinkage or swelling of wood of the key bed will not cause binding because, since the lever 129 is of metal and the arm 131 also of metal, any shrinkage or swelling of the wood will simply cause the screw which passes through the slot 132 to shift along said slot. If, however, it be desired to adjust the handle portion of the lever which carries the manuals hereinafter described, slightly forward or back, the screw which passes through the transverse slot 133 can be employed to adjust the arm 131 so as to carry the pivot 130 slightly back or toward the front in order to prevent any binding.

The front of the tempo box, as indicated in Figs. 4 and 11, has a removable plate which includes a transparent pane 134 through which the position and operation of the tempo slide valve may be observed. As the plate carrying said pane is removable, (suitable packing being employed, of course, if necessary), the tempo valve may be removed through said opening by disconnecting the parts as I shall now describe. Referring to Fig. 10 it will be seen that the arm 125 of the rock shaft has a leaf spring 135 at the front end of which is a pin 136 which passes through a hole in the end of the link 124 into the arm 125. When the mechanism shown in Fig. 4 is to be removed as a unit, by means of the handles, and after removing the bolts through the cheek boxes 39, as hereinbefore explained, the connection between the arm 125 and the link 124 is separated by lifting the leaf spring 135. This same disconnection is to be effected whenever the tempo slide valve is to be removed in order that the valve rod 120 may rotate to swing the pin 117 in the direction of the arrow (Fig. 11), thereby enabling the slide valve to be taken out for examination or repairs through the opening resulting from removing the plate which carries the transparent pane 134.

It will be observed that the construction and arrangement of the tempo slide valve is such that no spring is necessary to cause it to co-act with the slot 112. Usually the operation of the tempo lever of a player piano causes a slight squeaking due to the spring which is employed to hold the throttle valve on its seat, and also due to the rubbing of the valve on its seat. I employ only air pressure and the slight force of gravity due to the valve itself. The pin 117 keeps the valve in proper position relatively to the pointer presently described, the rod 120 being guided at both ends as hereinbefore described. When a player piano is idle and its throttle valve has a spring to hold it down, the facing of the valve will become embossed due to the constant pressure of said spring. My improved construction eliminates all pressure of the valve on its seat when the piano is not in use, excepting the very light pressure caused by its own weight. Any embossing of the valve interferes with the speed of the motor because it will then no longer accurately control the amount of air passing.

Referring to Figs. 4 and 5, the controller spring 100 for the motor regulator 54 has its upper end engaged with the projecting end of the tie-rod or bolt 105. If it be desired to adjust the tension of this spring, it is only necessary to unhook its upper end and then rotate the spring one way or the other according to whether its tension is to be increased or decreased, the coils of the spring co-acting with the transverse pin 99 in a manner similar to a screw. The upper end of the spring then is again hooked in position.

This provides easily adjustable means, in a conveniently accessible position, for varying the power of the regulator or choker bellows 54 to correct fluctuations of the motor. When this spring is adjusted to steady the operation of the motor regardless of high or low vacuum tension, the tempo valve 115, if not right, will be adjusted along the rod 120 to cause the motor to impart the correct speed of travel of the note sheet, for instance, to cause 40 feet of the note sheet to pass the tracker openings in ten minutes when the pointer 122 is at the 40 degree mark of the scale.

Referring to Figs. 8 and 10, the left hand end of the throttle box has an aperture which is externally closed by a flap valve 137. Projecting from the hub 118 that is secured to the valve rod 120 is a small rod or pin 138 which is so positioned, and is of such a length, that when the throttle valve 115 reaches the end of the slot 112, the end of the rod 138 will pass through the opening referred to and will open the valve 137, thereby instantly admitting atmospheric air. The opening of this valve 137 insures the instant stoppage of the motor, whereas without such a valve the air remaining in the tempo box might remain, under sufficient tension, to cause the motor to operate slightly further even after the valve 115 has closed the tempo slot.

I will next describe my present improvements relating to the short stop which enables the performer to instantly arrest all operation of the player mechanism. The communication between the tempo box 53 and the short stop box 108 is by means of a flanged aperture 139, (see Fig. 11 and dotted lines in Fig. 10), said aperture being adapted to be closed by a valve 140, this valve being called the short-stop valve or roll-detention valve. The reason for providing the separate chamber by means of the shallow box 113 under the tempo box 53 is to more effectively shut off the current of air passing through the port 139, because it enables a circular port and valve 139, 140 to be utilized as distinguished from a long valve adapted to co-act with the full length of the slot 112. A long valve is more liable to warp than a circular one providing for the passage of the same quantity of air. The stem 141 of this valve normally extends nearly to a float 142 carried by a diaphragm 143 the margin of which is clamped between upper and lower members 144, 145 of a shallow or flattened circular chamber, the connection between the two members being preferably by means of removable screws. A boss 146 of the lower member 145 has an aperture 147 with which connects a pipe 148, this pipe being preferably a small flexible rubber tube. The pipe 148 is shown by comparing Fig. 7 with Figs. 4 and 18, in which latter figure it is indicated only diagrammatically. The other end of the pipe 148 is controlled by a manual which is carried by the tempo lever, and which will be hereinafter described, so that whenever the performer wishes to instantly arrest the entire operation of the motor, one finger pressed upon the manual will admit atmospheric air to the pipe 148 and to the chamber or space below the diaphragm 143 in Fig. 11. The result is that the vacuum tension above the diaphragm will cause the valve 140 to instantly seat itself and stop the motor mechanism. The member 144 of the diaphragm chamber is permanently secured to the bottom of the box 108 by any suitable means. It is sometimes necessary to remove the short stop valve 140. The stem 141 of the valve 140 is mounted in a guide 149 having a plurality of branching legs 150, the extreme lower ends of which have bosses 151 which snap into engagement with the upturned flange 152 of the bottom of the box 108. When the valve 140 is to be removed, the lower member 145 of the diaphragm chamber is disconnected from the upper member and taken away with the diaphragm. Access is thereby had to the legs 150 of the guide 149 so that said legs can be sprung sufficiently toward each other to disconnect them from the flange 152 and enable the guide and the valve stem and valve to be bodily removed and dusted or otherwise improved in condition, or a new valve facing be substituted for an old one. This support for the valve possesses a further advantage in that the one guide 149 keeps both ends of the stem in proper position, it being of sufficient length to accurately control the movements of the valve and prevent it from tilting without the necessity of employing two separate guides for the valve or valve stem.

Referring to Fig. 12 it will be seen that an aperture 153 connects the tempo box 53 with the re-wind valve box 109, the margin of said aperture forming a seat for the re-wind valve 154 having a stem 155 the lower end of which normally extends nearly to a float carried by a diaphragm 159 carried by a casing 158 which is preferably similar in construction to the casing above described for the diaphragm 143. The lower member of the casing 158 has a boss 159 in which is formed a side aperture 160 and a bottom aperture 161. A guide 162 for the valve stem 155 is similar in construction to the guide above described for the short stop valve 140.

The boxes 108, 109 are provided respectively with transparent panes 163, 164, which are carried by removable plates, the construction being similar to that of the transparent front portion of the tempo box above described, these transparencies enabling the condition and operation of the short stop valve and re-wind valve to be examined. I will mention here, however, that when it is desirable to remove the valve 154, a top portion of the tempo box 153 hereinafter described, is removed, and the valve 154 can then be lifted out up through the tempo box, the legs of the guide being held in position in a manner similar to the legs of the guide 149.

Communicating with the aperture 160 is a nipple 165 to which the flexible tube 69 hereinbefore referred to is connected. (See Figs. 7 and 18). Another flexible tube 166 which will be hereinafter referred to and which is shown diagrammatically in Fig. 18, connects the skip manual 232, hereinafter described, with the tube 69 at an intermediate point of the latter. I shall now describe the means for controlling the re-winding of the music roll. Referring to Fig. 4 first, the re-wind manual 167 is slidably supported by the bottom of the tracker box, said manual being secured to a rod 168 which is guided in an aperture in the bracket 121, the end of said rod being pivotally connected to the lower end of a lever 169 of the reversing mechanism of the transmission gearing, said lever being pivoted at 170 and having a curved arm 171. As the reversing mechanism forms no part of my present invention, no reference thereto need be made herein other than to state that movement of the rod 168 in the direction of its length causes the motor when operating, to re-wind the music roll. The curved arm 171 is connected by a link 172 to an arm 173 (Fig. 20) of a rock shaft 174 (Figs. 4, 7 and 12) said rock shaft being journaled in a bearing in the strut 114 and in a hanger 175 depending from the motor main 40. Said rock shaft is provided with an arm 176 having a valve 177 which normally closes the bottom aperture 161 as shown in Fig. 12. The rock shaft 174 also acts as a torsion spring, rendering unnecessary the employment of a separate spring to yieldingly actuate the valve 177. This is due to the arms 173, 176 of said shaft, the connection between arm 173 and link 172 being adjustable as by means of nuts such as illustrated in Fig. 20. When the rewinding manual 167 is operated as described, so as to effect the reversal of the operation of the transmission gear, the connections just described cause the arm 176 to move downwardly from the position shown in Fig. 12, resulting in permitting air at atmospheric pressure to pass into the chamber below the diaphragm 157, so that the vacuum tension above said diaphragm will cause the valve 154 to be raised from its seat and remain in raised position during the rewinding operation. At this time, of course, the vacuum tension does not act to cause the playing of notes because the result of the movement of the valve 177 as just described is to permit air at atmospheric pressure to pass through the side opening 160 and into the tube 69 (Figs. 7 and 9), resulting in lifting the cut-out valve 63, which as hereinbefore described, prevents playing during either re-winding or "skipping."

It will now be understood that the re-wind valve 154 is actuated as the result of the operation of either one of two means, viz.: the connections including the rock shaft 174, or the pressure of the skip button or silent traveler manual 232 hereinafter described, so as to admit air through conduits 166 and 69. I therefore provide a single valve device to accomplish either one of two purposes, viz.: the skipping of a portion of the music or the re-winding of the note sheet, either one of which requires that all of the note actuating mechanism shall be inoperative. This is accomplished by the tubes 166, 69, the former joining with the latter as indicated in Fig. 18. Below the joint, the portions of the tube 69 may be considered a shunt conduit, so that actuation of the manual 232 causes the cut out valve 63 to close simultaneously with the opening of the re-wind valve 154.

The opening in the tempo box through which the valve 154 may be removed as hereinbefore described, preferably consists of a transparency 178 carried by a removable frame 179 (Fig. 12).

Figure 3:
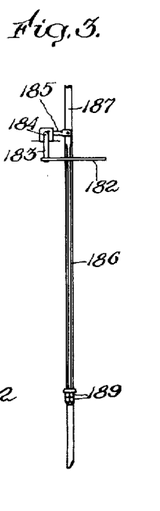

I will now describe the sustaining lever 180 and its connections, referring to Fig. 18. Said lever is pivoted to an angular arm 181 which is constructed the same as the angular arm 131 hereinbefore described, so that said sustaining lever can be set or adjusted at any time to prevent binding of the handle portion of said lever in the usual curved slot for it. The structures of the supporting arms 131, 181 for the levers 129, 180 respectively, not only takes care of climatic changes as hereinbefore stated, but also facilitates the setting up of the instrument because adjustments can be readily effected, if necessary, after the parts are in place. The lever 180 is connected by a link 182 to an arm 183 of a rock shaft 184, (see also Fig. 3) said rock shaft having an arm 185 to which the upper end of a link 186 is connected, the lower end of said link being connected to a vertically movable rod 187 by means of an eye 188 of said rod, one or more adjusting nuts 189 providing for an adjustable connection between the lifting link 186 and the rod 187, while permitting the rod 187 to be lifted by the foot pedal hereinafter mentioned, without acting upon the link 186. The upper end of the rod 187 contacts with an arm 190, which by well-known connections unnecessary to describe, will act to increase the distance of the dampers 191 from the strings when a sustained tone is desired. The lower end of the rod 187 is engaged by the usual lever having a foot pedal 192, the pivot being indicated at 193. This pedal, of course, is not employed when the piano is being operated under the control of a perforated music roll.

A small tube 194 to admit air to the tracking regulator 49 as hereinafter described, is indicated diagrammatically in Fig. 18.

I will now describe the mechanism for controlling the treble and bass divided hammer rail actions. In Fig. 18 the chest for the bass action is indicated at 195, and the chest for the treble action at 196, the latter being illustrated in more detail in Fig. 1. As the mechanism is the same at each end, I will describe that which is employed for the treble, referring especially to Figs. 1 and 2. The valve shell is indicated at 197 and the power pneumatic at 198, the vacuum conduit 199, connecting the chest 196 with the elbow coupling 86. Of course, the bass action is provided with a similar vacuum conduit. Connected to the movable member of the power pneumatic is a link 200, the lower end of which is slotted or divided at 201, the arms being adjustably connected by a screw 202. A block 203 fitted to the slot 201 is held in the desired position of vertical adjustment by means of the clamp screw 202 binding the arms each side of the slot against the sides of the block 203.

The upper surface of the block 203 engages the end 204 of a well-known form of crank, which is so connected to the inner divided rail 205 as to shift the latter nearer the strings of the piano. The outer divided rail is indicated at 206 in Fig. 1 and the hammers at 207. As the structure of the divided rails and their supports forms no part of my present invention, I do not illustrate or describe the same herein in detail, it being sufficient for present purposes to explain that upward movement of the link 200 causes the hammer rail to be so shifted as to give the hammers 207 a position of rest nearer the strings. Repeated action results in compression of the felt facings of the divided rails and calls for adjustment. The structure of the divided link 200 and the adjustable block 203 is such as to enable adjustment to be made to compensate for any such compression of the felt facings.

Small tubes 210, 211, are provided to admit atmospheric air to the chests 195, 196 respectively. As my present invention does not relate to the particular mechanism whereby the admission of air to either chest will result in the collapsing of the power pneumatic so as to shift the bass or treble hammers nearer the strings, I have not undertaken to illustrate such mechanism, in detail. Such mechanism is, or may be, of any of the well-known constructions. My present invention in this feature resides only in the manuals for controlling the admission of air at atmospheric pressure through the tubes 210, 211 to the bass and treble actions, and the same will be described presently. In Fig. 1 the tube 211 is not continued for its full length, in order to avoid confusion. The course of both of the tubes 210, 211 is indicated in Fig. 18.

Figure 14:
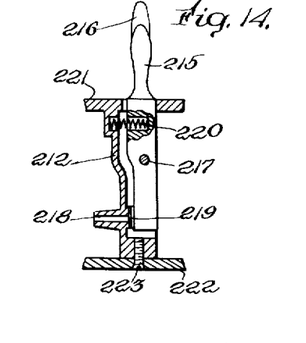
Fig. 14 is a front elevation, partly in section, of the manuals for controlling the bass and treble.
Figure 15:
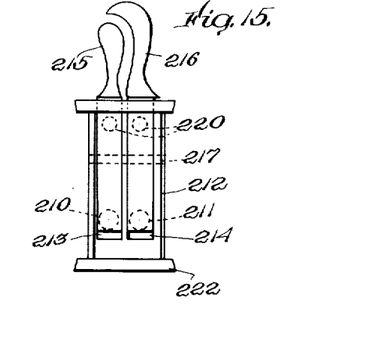
Fig. 15 is an elevation looking from the right of Fig. 14.

Referring to Figs. 14 and 15, a block 212, which in practice is fixed in a recess in the key-bed, as indicated in Figs. 4 and 18, is formed with two chambers 213, 214. Two levers 215, 216, which I shall refer to hereinafter respectively, as the bass manual and the treble manual, are pivoted at 217, the lower end of each of these manuals being adapted to control the passage of air through a nipple 218 by means of a valve 219 carried by each of said manuals. Normally both of the valves are held closed by springs 220. The two tubes 210, 211 are connected to the two nipples 218. Operation of either of said manuals, in opposition to its spring, opens a valve 219 and admits air through the tube which connects with the chest of the bass action or the treble action, resulting in varying the position of the bass or treble hammers in a manner well understood. This portion of my present invention resides in the construction and arrangement of the manuals whereby they are both so situated that they may be either simultaneously or independently actuated by one digit of one hand of the performer, while other digits of the same hand may control the sustaining lever or remain at rest. It will be observed that the manuals 215, 216 are normally in the same plane, one behind the other, and one higher than the other. Both are normally held by their springs in the position shown in Fig. 14.

The left hand thumb, bearing against the right hand side of these two manuals may be easily rocked so as to move either one and only one of said manuals, or by direct pressure may operate both of them. The amount of movement of the manuals necessary to admit air to either of the tubes 210, 211 is very slight.

The block 212 has a top flange 221 adapted to be seated in a mortise in the upper surface of the key-bed, or any other desirable location, the block extending down through a hole in such bed and having a plate 222 secured to it as by one or more screws 223. Said plate can be attached from below the key bed. This structure is such that no screws are visible above, and the device can be readily fitted to a hole in the wood and the predetermined relationship of the manuals 215, 216 thereby becomes permanent.

Figure 16:
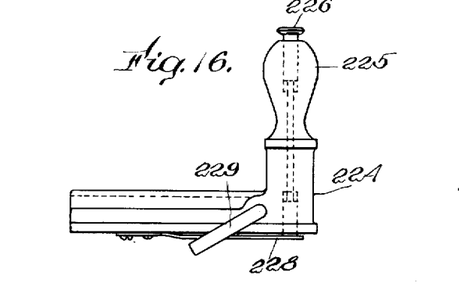
Fig. 16 is a side elevation of the device carried by the tempo lever, said device including manuals for the expression or choker bellows and for arresting or stopping the motor.
Figure 17:
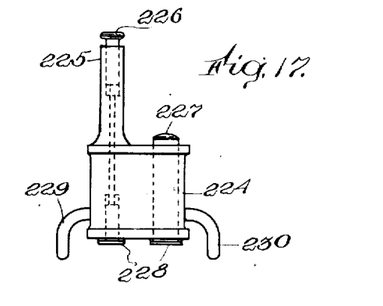
Fig. 17 represents a front elevation of the same.

As indicated in Fig. 18 the tempo lever 129 has at its front end a block 224 (see Figs. 16 and 17) said block being located in the curved slot of the key bed hereinbefore referred to. Rising from the top of the block is a handle 225 in which is mounted a push button 226. Also mounted in the block is a push button 227. The two push buttons are normally raised by springs 228 having valves to control passage ways through nipples 229 and 230. The structure illustrated in Figs. 16 and 17 may be of the type illustrated and described in my application 721,405 filed September 20, 1912 in view of which further description will be unnecessary. It is sufficient to explain that the nipple 229 is connected to the tube 68 and the nipple 230 is connected to the tube 148 so that the depression of either one of the push buttons will admit air to one or the other of said tubes. The push button 226 constitutes a manual for controlling the admission of air to cause the by-pass valve 62 (Fig. 7) to be seated, and the push button 227 constitutes the manual that will control the admission of air through tube 148 to the chamber below diaphragm 143 (Fig. 11) so as to effect the closing of the short stop valve 140.

The sustaining lever 180 has secured to its front end a block having push buttons or manuals, the same as the device carried by the tempo lever. The connections are such that the manual 231 (Fig. 18) controls the admission of air to the tube 194 leading to the tracking regulator 49, while the manual 232 controls the admission of air to the tube 166 which, as hereinbefore explained, is connected to the tube 69 so that the admission of air by means of said manual 232 will effect the opening of the rewind valve 154 (Fig. 12) and will also effect the closing of the cut-out valve 63, (Figs. 7 and 9) thereby preventing playing. This permits what is called skipping, that is, it permits the motor to operate the note sheet rapidly but cuts out the connection with the playing mechanism. The manual 232 is therefore called the silent traveler manual.

As best shown in Fig. 18 there are eight manuals in three groups, two of said groups being so conveniently located relatively to each other that the manuals can be controlled by the digits of one hand, there being five of such manuals including the sustaining lever as one of the five, the other three manuals being controlled by the digits of the other hand of the performer. In spite of this close and convenient relationship the manuals are so shaped and located as to relative height that there is no possibility of mistaking which manual is to be operated even if the performer is playing in the dark or without looking at the instrument at all.

Figure 13:
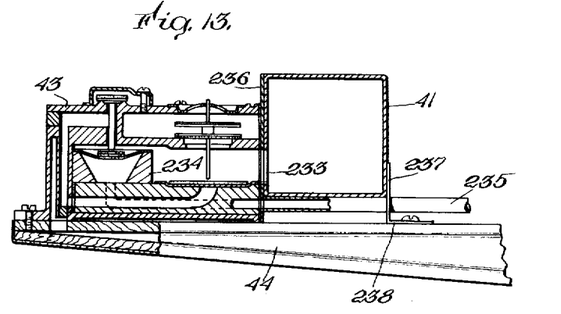
Fig. 13 represents one of the seamless primary shells and one of the pneumatic vacuum chests in section.

In Fig. 13 I illustrate a further improvement which reduces the liability of leakage due to joints. In said figure I illustrate a seamless shell and valve construction such as illustrated and claimed in my application 737,074 filed Dec. 16, 1912. The vacuum chest 41, however, does not extend down to the top of the striking pneumatic 44. In said former application the tubes connecting with the valve block in the shell 43 extended through the vacuum chest thereby rendering it necessary to take special care to avoid leakage where the tubes passed through. In Fig. 13 the valve block is indicated at 233 and the raised section at 234. A small tube 235 extends under the vacuum chest. This tube 235 is either connected to one of the tracker tubes 50 or may be considered as the upper end of one of such tubes 50. It leads directly to the port or passage in block 233 without going through the vacuum chest. To firmly support the parts of this structure I provide the front of the vacuum chest with a reinforcing plate 236 brazed or otherwise secured to the front of said chest, the lower edge of the plate extending down substantially to the top of the fixed member of the striking pneumatic 44. Brazed or otherwise secured to the rear of the chest 41 is a plate 237 having a foot portion 238 through which a screw passes into the fixed member of the striking pneumatic. Each of these plates 236, 237 extends below the vacuum chest and supports the tube. Of course, it will be understood that the plates preferably extend the full length of the vacuum chest so as to support the entire row of tubes 235 or 50. Either one or both of these plates serve not only to reinforce the vacuum chest but also to support the tubes so that when the blocks 233 are in place there will be perfect alinement of the air ways, the structure at the same time avoiding any necessity of making openings in the vacuum chest other than those which connect with the chambers above the blocks 233.

I claim:

1. The combination with a partitioned seamless shell having an open side, of a cover for said open side, said cover having shelf-like projections provided with diaphragm-supported valves and with ports for the admission of air to actuate said valves.

2. In an automatic musical instrument, a seamless partitioned casing or shell having an open side, a cover removably connected to said open side and having shelf-like projections located in the chambers on opposite sides of the partition, said projections being of less lateral area than the chambers, and diaphragm-supported valves carried by said projections.

3. In an automatic musical instrument, the combination with the vacuum main thereof, of a single seamless shell interposed in said main and by-pass and cut-out valves contained therein.

4. In an automatic musical instrument, a casing partitioned to form two chambers, said casing having a removable side member, and two pneumatically operated valves located one in each of said chambers and carried by said side member.

5. In an automatic musical instrument, a casing partitioned to form two chambers, said casing having a removable side member, two pneumatically operated valves carried by said side member and located one in each of said chambers, and a regulating bellows secured to another side of said casing, said casing and its contents and the bellows being removably supported as a unit.

6. In an instrument of the character described, an expression or choker bellows having a tension spring and a supplemental tension spring connected to its movable side to oppose collapsing, and manually controlled means to vary the tension of said supplemental spring during playing.

7. In an instrument of the character described, an expression or choker bellows having a tension spring and a supplemental tension spring connected to its movable side to oppose collapsing, and a manually operable lever for varying the tension of said supplemental spring during playing.

8. In an automatic musical instrument, the combination with the motor and a regulator bellows therefor, of a coiled spring connecting the movable member of said bellows with a fixed point, means being provided whereby rotation of said spring will vary its tension.

9. In an automatic musical instrument, the combination with the motor and a regulator bellows therefor, of a coiled spring connecting the movable member of said bellows with a fixed point, the attaching means at one end of the spring consisting of a pin extending through the coils of the spring whereby rotation of the spring will cause it to coact with said pin like a screw to vary the tension of the spring.

10. In an automatic musical instrument, the combination with the motor and a regulator bellows therefor, of a loop carried by the movable member of the bellows, a coiled spring secured at one end to a fixed point and passing through said loop, and a pin extending across the loop between coils of the spring.

11. In an automatic musical instrument, the combination with the tempo valve box of a valve box rigidly connected with the tempo box at one end, a support for the other end of the tempo box, a motor main supporting the first said end of the tempo box through the medium of said valve box, and a motor supported by said tempo box.

12. In an automatic musical instrument, the combination with the tempo box and slide valve therein, of two boxes rigidly connected with said tempo box and valves for effecting re-winding of the music roll and for effecting a stoppage of the player mechanism, said valves being contained in said two boxes.

13. In an automatic musical instrument, the combination with the tempo box and slide valve therein, of two boxes rigidly connected with said tempo box and valves for effecting re-winding of the music roll and for effecting a stoppage of the player mechanism, said valves being contained in said two boxes, and said boxes having transparent portions to permit inspection of the valves.

14. In an automatic musical instrument, the combination with the tempo box and slide valve therein, of two boxes rigidly connected with said tempo box and valves for effecting re-winding of the music roll and for effecting a stoppage of the player mechanism, said valves being contained in said two boxes, and said boxes having removable portions to permit removal of the valves.

15. In an automatic musical instrument, an elongated box having a slotted floor, a valve movable over said slotted floor, a shallow box below the slotted portion of said floor, a motor, and conduit connections between said boxes and said motor.

16. In an automatic musical instrument an elongated box having a slotted floor, a valve coöperating with the slot, a box forming a compartment below said slotted floor, a motor, and conduit connections between said compartment and the motor, said connections including a substantially circular valve and seat controlling the passage from said compartment.

17. In an automatic musical instrument, a tempo box having a slotted floor, a rod movable lengthwise of the box and having a slide valve loosely connected with it to permit the valve to remain on its seat solely by gravity or atmospheric pressure.

18. In an automatic musical instrument, a tempo box having a slotted floor, a rod movable lengthwise of the box and having a pin, and a slide valve having a transverse recess engaged by said pin.

19. In an automatic musical instrument, a tempo box having a slotted floor, a rod movable lengthwise of the box and having a pin adjustable lengthwise thereof, and a slide valve having a transverse recess engaged by said pin.

20. In an automatic musical instrument, a tempo box having a floor provided with an elongated slot, a rod movable lengthwise of the box and having a slide valve connected to it, said rod having a pointer also connected to it beyond one end of the box, and a scale to coöperate with said pointer to indicate the position of the valve.

21. In an automatic musical instrument, a tempo box having a floor provided with an elongated slot, a rod movable lengthwise of the box and having a slide valve adjustably connected to it, said rod having a pointer also connected to it beyond one end of the box, and a scale to coöperate with said pointer to indicate the position of the valve.

22. In an automatic musical instrument, a tempo box having a floor provided with an elongated slot, a rod movable lengthwise of the box and having a slide valve connected to it, said rod having a pointer also connected to it beyond one end of the box, and a scale to coöperate with said pointer to indicate the position of the valve, a vertical rock shaft having an arm, a link connecting said arm with the other end of the valve rod, and a tempo lever and connections for operating the rock shaft thereby.

23. In an automatic musical instrument, a tempo box having a slotted floor, a rod extending through both ends of the box and supported and guided thereby, a valve connected with said rod, means connected with one end of the rod for sliding it, and a pointer connected to the other end portion of the rod.

24. In an automatic musical instrument, a tempo box having an end opening, a valve normally closing said opening, a slide valve and a rod therefor movable endwise of the tempo box, and a projection carried by said rod in position to pass through said end opening and unseat the valve thereof when the rod reaches a predetermined position.

25. In an automatic musical instrument, a tempo box having an end opening, a valve normally closing said opening, a slide valve and a rod therefor movable endwise of the tempo box, and a projection carried by said rod in position to pass through said end opening and unseat the valve thereof when the rod reaches a predetermined position, said projection being adjustable along the rod.

26. In an automatic musical instrument, a tempo box having a slide valve therein, a rod for actuating the valve, a pin having a free end and carried by said rod parallel therewith, said box having an opening in one end in position for the pin to project through it when the rod and valve reach a predetermined position, and a valve normally closing said end opening.

27. An automatic piano player having bass and treble manuals comprising levers pivotally supported in one plane, the upper end of one lever being higher than the other.

28. An automatic piano player having bass and treble manuals comprising levers pivotally supported one behind the other.

29. An automatic piano player having bass and treble manuals comprising levers pivotally supported one behind the other, the rearmost one being higher than the other, said levers being relatively mounted whereby they may be operated simultaneously by the pressure of a thumb or finger or may be operated independently and alternately by a rocking movement of such thumb or finger.

30. In an automatic musical instrument, a tempo valve box having a pair of valve boxes rigidly connected below it, valves for controlling the passageway through said boxes, diaphragm casings connected to each of said pair of boxes, and diaphragms in said casings for actuating the valves of said pair of boxes.

In testimony whereof I have affixed my signature, in presence of two witnesses.

WILLIAM A. WATSON.

Witnesses:
A. W. HARRISON,
GEORGE A. ROCKWELL.